Aug. 27, 1940.  C. G. KEETON  2,212,501
APPARATUS FOR PRODUCING CARBON BLACK
Original Filed April 17, 1934    4 Sheets-Sheet 1
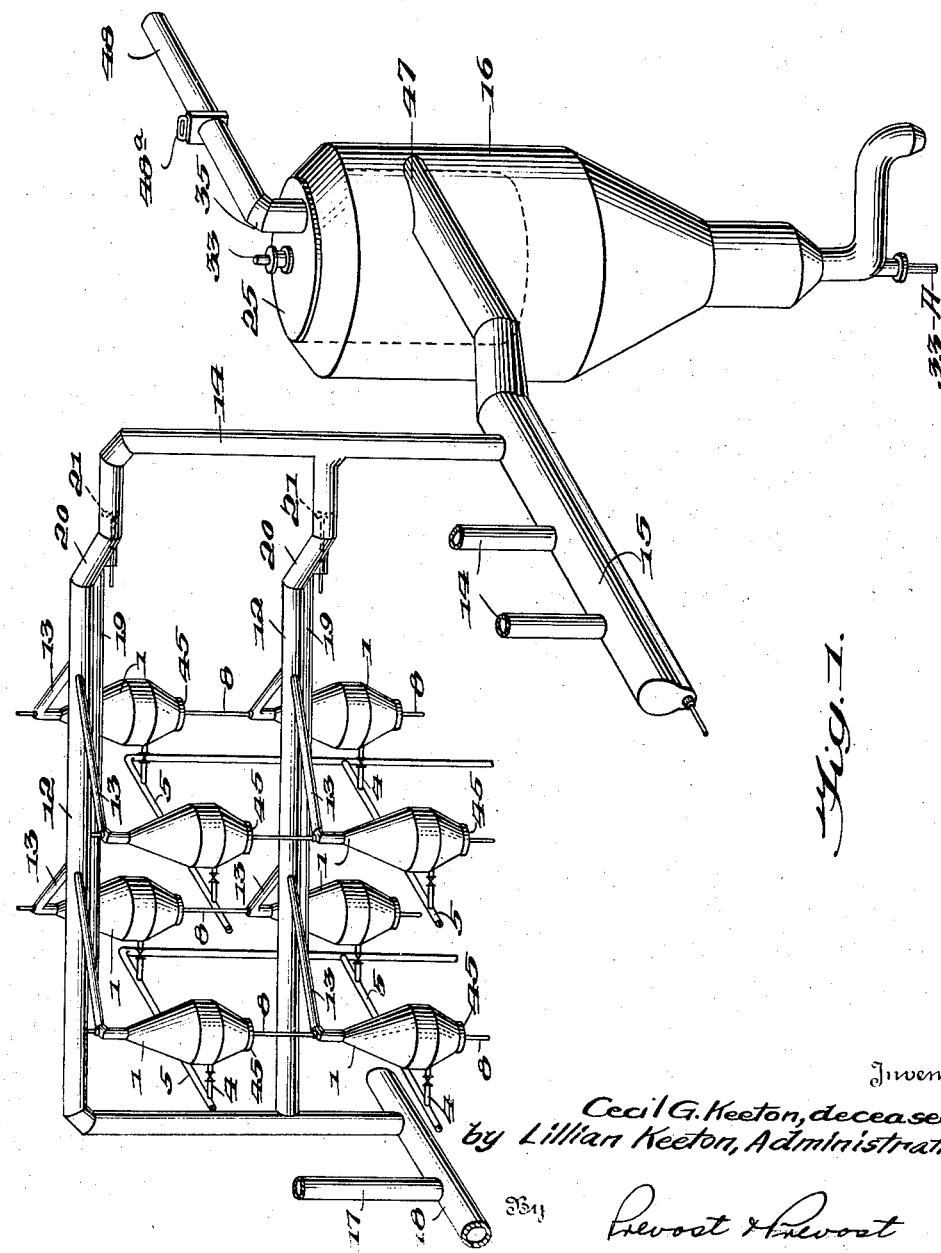
Inventor
Cecil G. Keeton, deceased,
by Lillian Keeton, Administratrix
Prevost & Prevost
Attorneys Aug. 27, 1940.  C. G. KEETON  2,212,501
APPARATUS FOR PRODUCING CARBON BLACK
Original Filed April 17, 1934  4 Sheets-Sheet 2
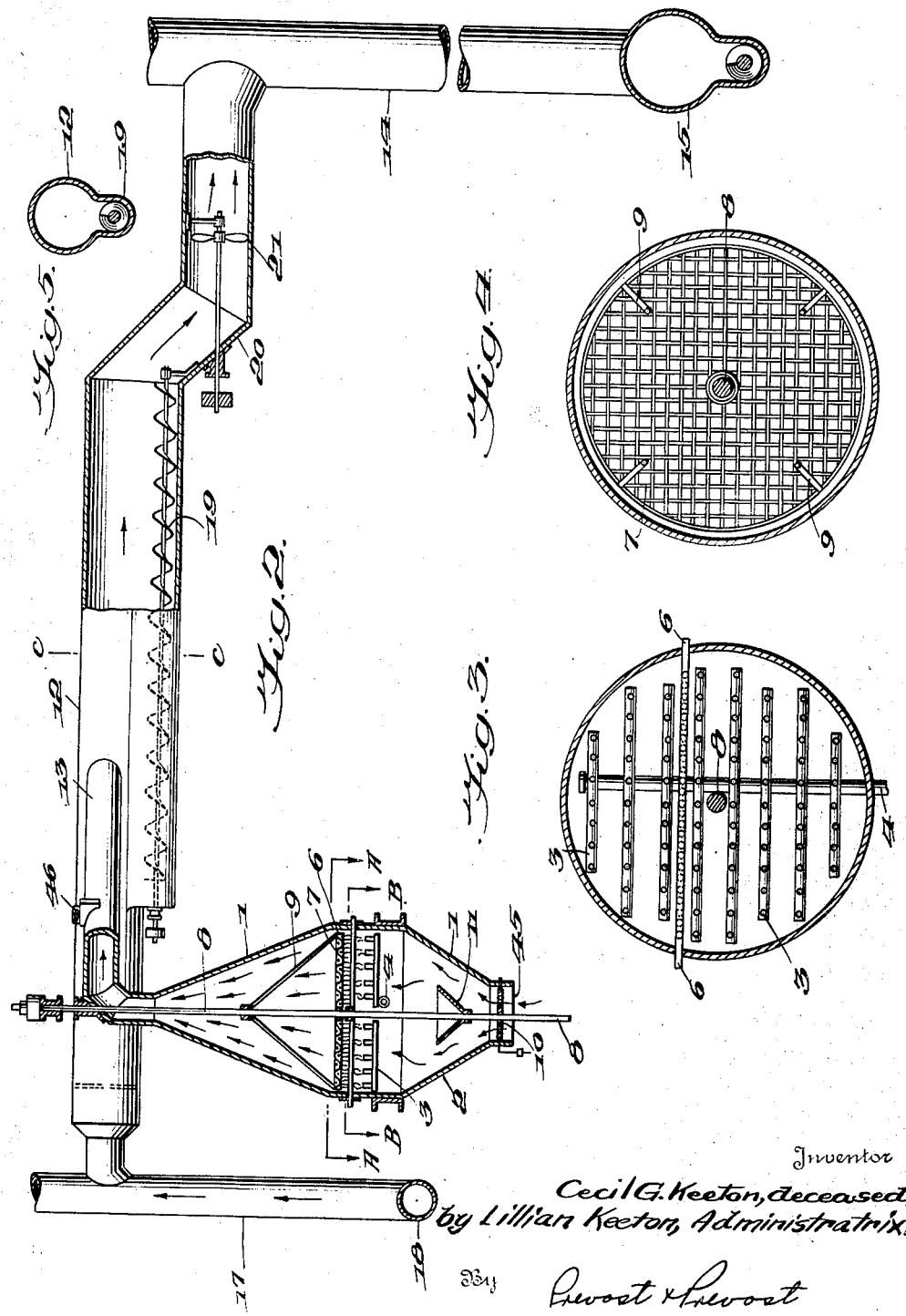
Inventor
Cecil G. Keeton, deceased,
by Lillian Keeton, Administratrix.
By Prevost & Prevost
Attorneys

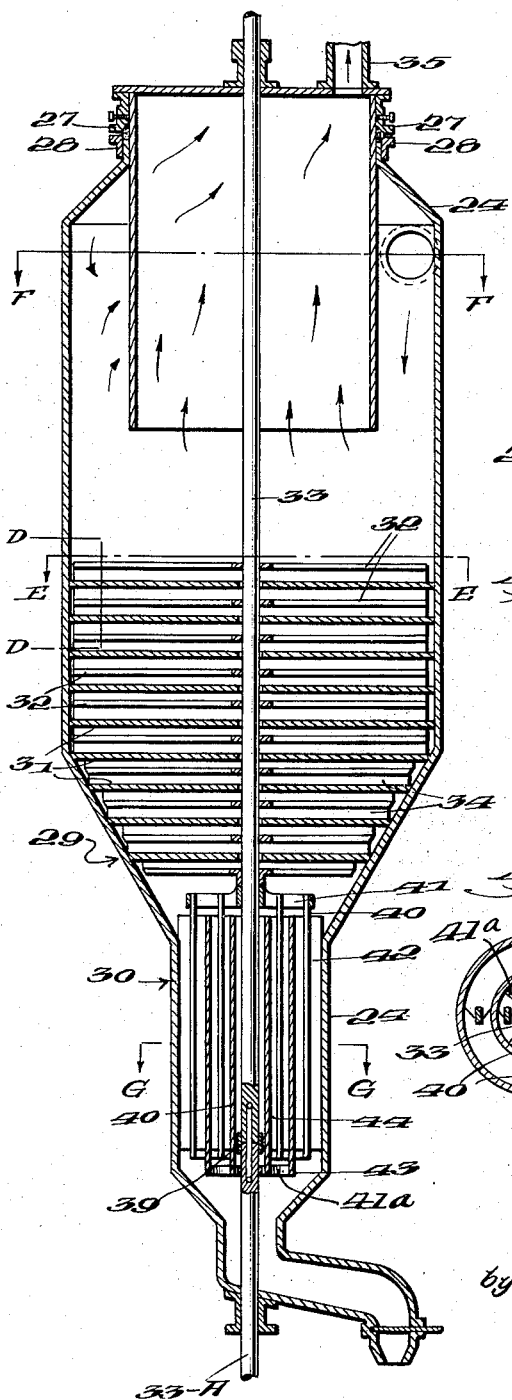

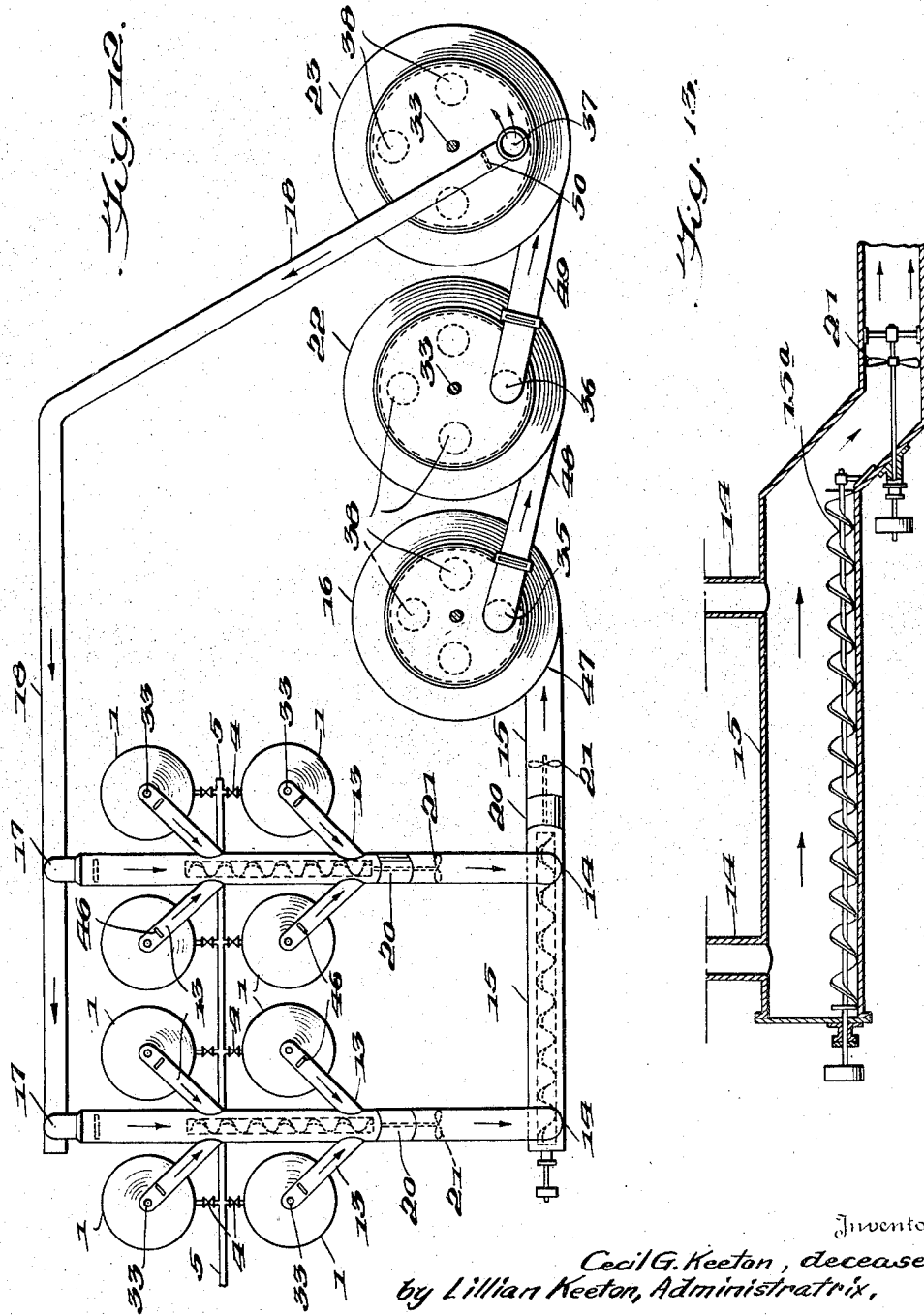

Patented Aug. 27, 1940

2,212,501

UNITED STATES PATENT OFFICE 2,212,501

APPARATUS FOR PRODUCING CARBON BLACK

Cecil G. Keeton, deceased, late of Independence, Mo., by Lillian Keeton, administratrix, Independence, Mo., assignor to Danciger Oil and Refineries, Inc., Tulsa, Okla.

Original application April 17, 1934, Serial No. 721,062. Divided and this application September 26, 1938, Serial No. 231,849

3 Claims. (Cl. 134—60)

The present invention relates to apparatus for the partial combustion of any suitable combustible product and combination of such combustible products, and especially to the partial combustion of natural gas and other suitable gases and the recovery, separation and collection of the carbon black obtained therefrom, this application being a division of application Serial No. 721,062 filed April 17, 1934.

The objects of this invention generally are to obtain high yields of the carbon black desired of improved dependable quality, with unique quality control, the carbon black being precipitated from the gases of combustion, leaving said gases substantially free from smoke.

This process is not subject to changing atmospheric conditions, barometric pressures, temperature variations, deleterious catalytic and chemical reactions, these detrimental factors in other processes having been overcome.

In the practice of this invention, utilizing natural gas as the raw material, there has been devised a carbon black producer (one or more of which may be used, as desired, in the process), with a burner preferably consisting of pipes, with burner tips spaced at equal distances apart in each pipe, the pipes being connected to one or more headers, and being of such size that the gas may be equally distributed through the burner tips, resulting, when the gas utilized is subjected to partial combustion, in producing a contented flame, so to speak, at each burner tip.

While air or other oxygen carrying agent may be supplied for mixture with the gas for combustion by means of a blower or blowers, either placed outside of the system or at some point within the system, or by both means, to better produce a contented flame, it is preferred that the one or more blowers be located within the system.

The gas issuing from the burner tips is caused to burn, so that this contented flame will result, by supplying a predetermined quantity of oxygen or air to the generator whereby the combustion of the gas may be regulated, and this regulation in conjunction with the contact media for producing carbon black placed above the burners, at any desired distance therefrom, producing the carbon black of desired qualities and quantities.

What is above termed the carbon black contact media for producing carbon black is considered an important feature of the invention.

It may be composed of many composition surfaces such as all metals, earthen clays, quartz, granite, asbestos and other substances which may be utilized for the purpose.

It is preferred, however, that the contact media for producing carbon black be made of various mesh screens of various sized wires of various composition metals, or various composition sheet metals or metal plates perforated with round various sized holes or slotted with any shaped opening to produce screen effect, or the desired screen effect may be produced by so arranging metal wires of certain composition and sizes, or metal rods of various composition and size, or by utilizing any suitable material other than of metallic composition, such as earthen clay, quartz, granite, asbestos or any other suitable material which will stand a temperature of at least 1000° F.

The contact media for producing carbon black both aids in the formation of carbon black and, by keeping the same clean (so that the gases of combustion with carbon black may pass through said media) enable the constant and uniform application of vacuum or suction on the flames, thus decreasing their temperature, and increasing the yield of carbon black from the raw product used for its production.

The contact media for producing carbon black are adjustable, by any preferred means, and therefore may be placed at a predetermined distance from where ignition of the combustible, used as raw material to produce carbon black, takes place; and it will be noted that the operator may use another media placed above the first, or several such media, each above the other, each at a predetermined distance from the other.

The media are so designed that they may be automatically divested of carbon black as it is produced, which is then conducted with the gases of combustion from the apparatus, and the carbon black separated from said gases.

It is preferred that the media are constantly revolved, although the media may be stationary and the divestors constantly revolved, or if desired, the burners may be revolved, or the media, divestors, and burners may be stationary.

The divestors may be either of the brush or vibrator type, or both types may be used.

The pressure and the volume of the gas supplied to the burners, are regulated.

The products resulting from the operations conducted in this apparatus are preferably exhausted from it by means of a blower or blowers.

The air required for the desired combustion is also introduced into the apparatus by the same means, and the major portion of the carbon black with the gases of combustion conveyed through several separating chambers of continually increasing size, equipped with milling devices, for the carbon black separated and deposited therein.

The temperature of the gases of combustion with the carbon black is maintained at such temperature as to prevent the condensation of the moisture, formed during the process of combustion, the carbon black deposited in these separating chambers being, in consequence, substantially free from moisture.

If, during the operation of conveying the carbon black into the several chambers, the original gas of combustion is found to be insufficient to act as a conveyor for the carbon black, a sufficient additional amount may be obtained when desired, from the gas outlet of the final separating chamber, such gas being recirculated for that purpose as hereinafter described.

In addition to the actuating means, hereinbefore named, of conveying the major portion of the carbon black with the gases of combustion, on its way to be separated for market from said gases, to convey a minor portion which may be deposited from such gases on the way for said separation a screw or other mechanical type of conveyor may be utilized.

The producers, pipes in which the gases of combustion, with carbon black, are conveyed, the separating chambers, and other parts of this system may be insulated if desired and any preferred type of automatic control instruments may be placed where desired in the system to assist in operating the process.

While, in practicing this process natural gas is given as an example, the invention is not restricted to the use of such gas but is intended to cover other gases of any composition desired for these operations, or any other suitable combustible product, and combination of such combustible products, and their use in combination with other gases which may be reacted in the presence of catalysts to produce diverse qualities aside from the standard types of carbon blacks now in use; and these combustible products may also be combined with non-combustible gases or materials under catalytic reaction before passing to the headers and through the remainder of the system as hereinafter described, to produce diverse qualities of carbon black.

Furthermore, the process may be practiced in such a manner that the partial combustion is caused or allowed to take place either under a pressure less than atmospheric, or at atmospheric pressure, or under pressures above atmospheric.

The advantages of this improved method and apparatus will more fully appear from the following detailed description and accompanying drawings, in which:

Figure 1 is a perspective view showing a battery of carbon black producers in connection with, for example, the first separating chamber.

Figure 2 is an elevation with parts shown in vertical section to illustrate the carbon black producer, screw conveyor and blower.

Figure 3 is a plan view in cross section of a carbon black producer taken at B—B in Fig. 2, showing the burners.

Figure 4 is a plan view in cross section of a carbon black producer taken at A—A in Fig. 2, showing one form of carbon black producing media; namely, a screen.

Figure 5 is a cross sectional view through conduit taken at C—C in Fig. 2.

Figure 6 is a vertical sectional view of a separating chamber.

Figure 7 is a view in cross section of a separating chamber taken at F—F in Fig. 6.

Figure 8 is a view in cross section of the milling device in a separating chamber taken at E—E in Fig. 6.

Figure 9 is a cross sectional view of the milling device taken at G—G in Fig. 6.

Figure 10 is a detailed sectional view on lines D—D Fig. 6 of the revolving and stationary blades of one type, for example, of a milling device.

Figure 11 is a vertical sectional detail showing method of sealing a joint in the separating chamber, showing the baffle in a raised position.

Figure 12 is a plan view of the carbon black generating and separating system.

Figure 13 is a horizontal sectional view of the main conduit, showing a screw conveyor therein.

Reference will now be made to the drawings in detail.

First, referring to Figure 2, there is illustrated in section a producer 1, with a metallic casing 2, burners 3 connected by laterals 4 to a header 5, shown in Figure 1.

Above the burners 3 are shown carbon divestors 6, shown, for example, as brushes which remove carbon black from the carbon black producing media 7, which is mounted on a vertical revolving shaft 8 (shown in Fig. 1 as serving more than one generator) by the means of rods 9. This media is adjustable by any preferred means, so that it may be placed at any predetermined distance above the burners tips.

An air admission control is shown at 10, and a deflector at 11.

The producer 1, is connected to conveyor conduit 12, by means of pipe 13, (as shown in Fig. 2 and Fig. 12), which discharges into pipe 14 which discharges into main conduit 15, shown in Fig. 13, which is connected to separating chamber 16 as shown in Figures 1 and 12.

Pipe 17 is one of a series of risers connected to return pipe 18 which is for recirculating final gases of combustion from a final separating chamber as shown in Fig. 12.

In conduit 12 a screw conveyor 19 is shown (for example if a mechanical conveyor is used), with offset 20 in which is provided an exhaust fan or blower 21 which both acts as a medium for inducting air to the producer and aids in conveying gases and carbon black through the separating chambers.

Power for the revolving carbon black producing media, screw conveyor and fan may be applied by any desired means.

Figure 6 is a typical cross sectional view through separators 16, 22 and 23 as shown in Figure 12.

In shell 24 is provided baffle 25 for producing a desired whirling motion to the gases of combustion with the carbon black, thus giving a longer time element for the separation of the carbon black from said gases.

This whirling motion is shown in Fig. 7, a sectional view through Fig. 6 on line F—F and there are also shown the positions to which outlets 35, 36 and 37 on Fig. 12 may be turned as desired to control the separation of the carbon black from the gases of combustion as indicated by dotted circles 38 in above named Figs. 7 and 12.

This baffle 25 may be raised or lowered (or turned as above mentioned) as desired for the above purpose, and Fig. 11 shows the baffle 25 in a raised position and means 27 for holding it in that desired position with the preferred method as shown at gasket 28 for making joints between outer wall 24 of separator and baffle 25 gas tight.

29 and 30 represent generally two cooperating milling units. The milling blades 31 of unit 29 are stationary and fastened to the outer wall 24 of the separator shell, the blades 32 of said unit being fixed to and adapted to rotate with a shaft 33 which extends vertically through the top of the separator. This shaft is constructed in two parts 33 and 33—A, the latter being supported at the lower end of the former by means of a collar 39 and extending through the lower end of the separator and milling device. The lower shaft section 33—A is adapted to be rotated in a direction opposite to that of the upper section 33, suitable means (not shown) being provided for causing this rotation.

The lower milling unit 30 consists of one set of blades 40 supported by an annular yoke 41 fixed to the upper shaft section 33 and adapted to rotate therewith. These blades 40 extend vertically and each carries a pair of scraper blades 42 suitably secured to the side faces of the blades 40 and adapted to rotate therewith. A second set of milling blades 43 and 44 in the form of coaxial cylinders are suitably secured at their lower ends to the lower shaft section 33—A by a radiating spider 41a whereby said cylinders are adapted to rotate with the lower shaft section in a direction opposite to that of the blades 32 of the upper unit 29 and the first set of blades 40 of the milling unit 30.

Referring to the drawings, the operation of the system may be described substantially as follows:

Utilizing natural gas as a raw material, the natural gas is introduced into each carbon black producer utilized through header 5, each carbon black producer consisting of the parts shown in Figs. 2, 3 and 4. Air for combustion is also introduced into the bottom of each carbon black producer as at 45, Figs. 1 and 2.

The gases of combustion with the carbon black pass out of top of each producer through conductor pipes 13, conductor pipes 13 being provided with a controlling damper 46 where it enters conveyor pipes 12, equipped with screw conveyor 19 and exhaust fan 21, the latter to both induce the air for combustion into the producer and convey the gases of combustion and carbon black to main header 15 as shown on Figs. 2 and 12.

From main header conduit 15, the gases and entrained carbon black are conveyed by means of screw conveyors 15a and exhaust fans as shown in Fig. 13 and discharged into separating tank 16 at 47, Figs. 1 and 12, and from separating tank 16 passes through conductor pipe 49 into separator 23, in each of which separating tanks a carbon black of desired grade is obtained, and from 23 the gases substantially free from carbon black are either passed to the atmosphere or passed through conductor pipe 18 to risers 17 of Fig. 1, where the gases of combustion again enter conductor pipes 12, for recirculation as a conveying means for the carbon black. Part of these gases may also be directly recirculated through pipe 15 by means not shown on drawing.

The amount of gas which is discharged to the atmosphere or recirculated is controlled by damper in riser 37 (damper not shown) and by damper 50 in conductor pipe 18.

A damper control 48a as shown in conductor pipe 48 in Fig. 1, is also placed in each conductor pipe leading from one separating chamber to another.

From the foregoing it is believed that the operation and advantages of the improved method may be readily understood by those skilled in the art without further description, it being borne in mind that numerous changes may be made in the details disclosed without departing from the spirit of the invention as set out in the following claims.

What is claimed is:

1. In apparatus for manufacturing carbon black, a carbon black producer having a mesh contact screen located intermediate its ends, a series of burners beneath said screen arranged in such proximity thereto that the flames from said burners will impinge on said screen, means for supplying a combustible gas to said burners, an opening in the lower end of said producer for admitting predetermined quantities of air to effect partial combustion of said gas adjacent the underside of said screen, whereby carbon black is produced and deposited on said screen, a divester for continuously removing the deposited carbon black from said screen, suction means connected to the upper end of said producer for simultaneously and continuously drawing the gases of combustion with the divested carbon black through said screen, and means for collecting the carbon black produced.

2. In apparatus for manufacturing carbon black, a carbon black producer having a contact screen member located intermediate its ends, a burner member located beneath said screen and arranged in such proximity thereto that the flame from said burner member will impinge on said screen, one of said members being rotatable with respect to the other, means for supplying a combustible gas to said burner member, an opening in the lower end of said producer for admitting predetermined quantities of air to effect partial combustion of said gas adjacent the underside of said screen whereby carbon black is produced and deposited on said screen, a divester for continuously removing the deposited carbon black from said screen, suction means connected to the upper end of said producer for simultaneously and continuously drawing the gases of combustion with the divested carbon black through said screen member, and means for collecting the carbon black produced.

3. Apparatus as claimed in claim 2 wherein said screen member is rotatable with respect to said burner member.

LILLIAN KEETON,
*Administratrix of Estate of Cecil G. Keeton, Deceased.*